United States Patent
Kuo

(10) Patent No.: US 11,030,798 B2
(45) Date of Patent: Jun. 8, 2021

(54) SYSTEMS AND METHODS FOR VIRTUAL APPLICATION OF MAKEUP EFFECTS BASED ON LIGHTING CONDITIONS AND SURFACE PROPERTIES OF MAKEUP EFFECTS

(71) Applicant: Perfect Mobile Corp., New Taipei (TW)

(72) Inventor: Chia-Chen Kuo, Taipei (TW)

(73) Assignee: PERFECT MOBILE CORP., New Taipei (TW)

( * ) Notice: Subject to any disclaimer, the term of this patent is extended or adjusted under 35 U.S.C. 154(b) by 0 days.

(21) Appl. No.: 16/708,472

(22) Filed: Dec. 10, 2019

(65) Prior Publication Data

US 2020/0242833 A1    Jul. 30, 2020

Related U.S. Application Data

(60) Provisional application No. 62/798,784, filed on Jan. 30, 2019.

(51) Int. Cl.
*G06T 15/00* (2011.01)
*G06T 15/50* (2011.01)
*G06T 3/00* (2006.01)

(52) U.S. Cl.
CPC ............ *G06T 15/50* (2013.01); *G06T 3/0068* (2013.01); *G06T 2200/08* (2013.01)

(58) Field of Classification Search
CPC .... G06T 15/50; G06T 3/0068; G06T 2200/08
See application file for complete search history.

(56) References Cited

U.S. PATENT DOCUMENTS

| 8,103,094 B2 | 1/2012 | Wilensky |
| 8,915,562 B2 | 12/2014 | Edgar et al. |
| 9,118,876 B2 | 8/2015 | Felt |
| 9,449,412 B1 | 9/2016 | Rogers et al. |

(Continued)

FOREIGN PATENT DOCUMENTS

CN    104159032 A    11/2014

OTHER PUBLICATIONS

"ModiFace Debuts new AR Technology for Rendering Makeup Shades;" https://www.gcimagazine.com/marketstrends/segments/cosmetics/Modiface-Debuts-new- . . . ; 2019; pp. 1-2.

(Continued)

*Primary Examiner* — Sarah Lhymn
(74) *Attorney, Agent, or Firm* — McClure, Qualey & Rodack, LLP

(57) ABSTRACT

A computing device obtains a digital image depicting an individual and determines lighting conditions of the content in the digital image. The computing device obtains selection of a makeup effect from a user and determines surface properties of the selected makeup effect. The computing device applies a facial alignment technique to the facial region of the individual and defines a region of interest corresponding to the makeup effect. The computing device extracts lighting conditions of the region of interest and adjusts visual characteristics of the makeup effect based on the surface properties of the makeup effect and the lighting conditions of the region of interest. The computing device performs virtual application of the adjusted makeup effect to the region of interest in the digital image.

12 Claims, 12 Drawing Sheets

(56) References Cited

U.S. PATENT DOCUMENTS

| | | |
|---|---|---|
| 10,049,433 B2 | 8/2018 | Lin |
| 2005/0175234 A1 | 8/2005 | Sakamoto |
| 2006/0233426 A1* | 10/2006 | Mariani ............. G06K 9/00288 |
| | | 382/118 |
| 2015/0178554 A1* | 6/2015 | Kanaujia ................... G06T 7/60 |
| | | 382/118 |
| 2015/0279113 A1* | 10/2015 | Knorr ....................... G06T 7/11 |
| | | 345/633 |
| 2019/0080508 A1* | 3/2019 | Johnson ........... H04N 5/232939 |
| 2019/0362546 A1* | 11/2019 | Wayenberg ............. G06T 19/20 |

OTHER PUBLICATIONS

"Shiseido's New "TeleBeauty" App , A Virtual Makeup Solution for Online Meetings;" https://www.shiseidogroup.com/news/detail.html?n=00000000002041; Oct. 2016; pp. 1-4.

Li, C., et al.; "Simulating Makeup through Physics-based Manipulation of Intrinsic Image Layers;" IEEE; pp. 4621-4629.

https://www.imgrumweb.com/post/BgCiolTn1EJ.

https://dqlin.xyz/tech/2016/12/02/03_sss/.

European Search Report dated May 4, 2020, issued in application No. EP 20154636.3.

Xu, L., et al.; "An Automatic Framework for Example-Based Virtual Makeup;" IEEE; 2013; pp. 3206-3210.

Evangelista, B., et al.; "Realistic AR Makeup over Diverse Skin Tones on Mobile;" 2018; pp. 1-2.

\* cited by examiner $I_n$: represents the luminance value for Vertex n ($V_n$)

SYSTEMS AND METHODS FOR VIRTUAL APPLICATION OF MAKEUP EFFECTS BASED ON LIGHTING CONDITIONS AND SURFACE PROPERTIES OF MAKEUP EFFECTS

CROSS-REFERENCE TO RELATED APPLICATION

This application claims priority to, and the benefit of, U.S. Provisional Patent Application entitled, "Method and Apparatus for Applying Makeup to Digital Images," having Ser. No. 62/798,784, filed on Jan. 30, 2019, which is incorporated by reference in its entirety.

TECHNICAL FIELD

The present disclosure relates to systems and methods for performing virtual application of makeup effects to digital images based on lighting conditions and surface properties of makeup effects.

BACKGROUND

Due to varying lighting conditions when capturing a digital image of an individual, it can be difficult to achieve a realistic result when performing virtual application of makeup effects. Therefore, there is a need for an improved system and method for performing virtual application of makeup effects.

SUMMARY

In accordance with one embodiment, a computing device obtains a digital image depicting an individual and determines lighting conditions of the content in the digital image. The computing device obtains selection of a makeup effect from a user and determines surface properties of the selected makeup effect. The computing device applies a facial alignment technique to the facial region of the individual and defines a region of interest corresponding to the makeup effect. The computing device extracts lighting conditions of the region of interest and adjusts visual characteristics of the makeup effect based on the surface properties of the makeup effect and the lighting conditions of the region of interest. The computing device performs virtual application of the adjusted makeup effect to the region of interest in the digital image.

Another embodiment is a system that comprises a memory storing instructions and a processor coupled to the memory. The processor is configured by the instructions to obtain a digital image depicting an individual and determine lighting conditions of the content in the digital image. The processor obtains selection of a makeup effect from a user and determines surface properties of the selected makeup effect. The processor applies a facial alignment technique to the facial region of the individual and defines a region of interest corresponding to the makeup effect. The processor extracts lighting conditions of the region of interest and adjusts visual characteristics of the makeup effect based on the surface properties of the makeup effect and the lighting conditions of the region of interest. The processor performs virtual application of the adjusted makeup effect to the region of interest in the digital image.

Another embodiment is a non-transitory computer-readable storage medium storing instructions to be implemented by a computing device having a processor, wherein the instructions, when executed by the processor, cause the computing device to obtain a digital image depicting an individual and determine lighting conditions of the content in the digital image. The processor obtains selection of a makeup effect from a user and determines surface properties of the selected makeup effect. The processor applies a facial alignment technique to the facial region of the individual and defines a region of interest corresponding to the makeup effect. The processor extracts lighting conditions of the region of interest and adjusts visual characteristics of the makeup effect based on the surface properties of the makeup effect and the lighting conditions of the region of interest. The processor performs virtual application of the adjusted makeup effect to the region of interest in the digital image.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Various aspects of the disclosure can be better understood with reference to the following drawings. The components in the drawings are not necessarily to scale, with emphasis instead being placed upon clearly illustrating the principles of the present disclosure. Moreover, in the drawings, like reference numerals designate corresponding parts throughout the several views.

DETAILED DESCRIPTION

Various embodiments are disclosed for performing virtual application of makeup effects based on lighting conditions and the surface properties of makeup effects. In accordance with various embodiments, both the lighting conditions surrounding an individual depicted in a digital image and the surface properties of a makeup effect to be applied to the facial region of the individual are analyzed. The visual characteristics of the makeup effect are adjusted based on the analysis and then applied to the facial region, thereby providing a more realistic representation.

Figure 1:
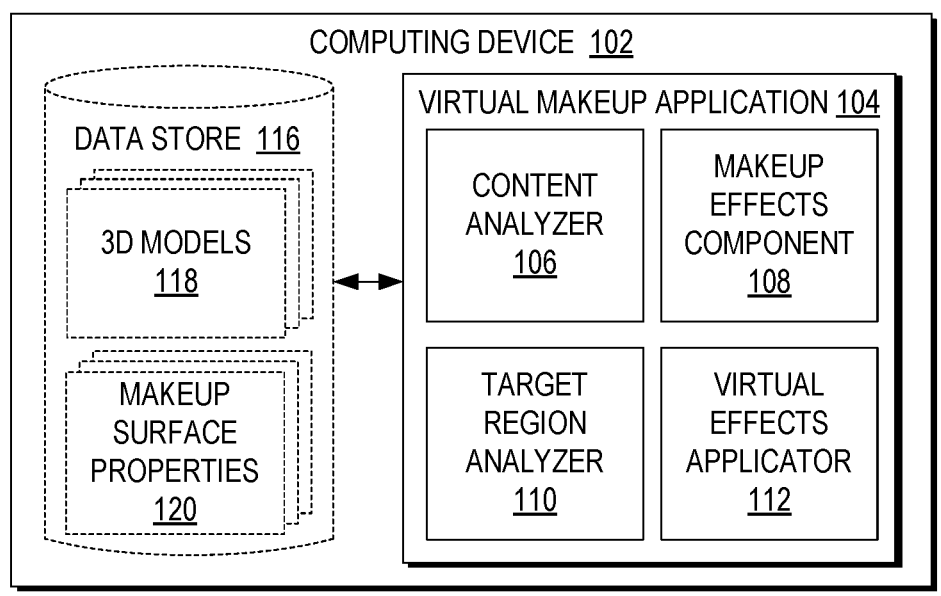
FIG. 1 is a block diagram of a computing device for performing virtual application of makeup effects based on lighting conditions and surface properties of makeup effects in accordance with various embodiments of the present disclosure.

A description of a system for performing virtual application of makeup effects based on lighting conditions and surface properties of makeup effects is now described followed by a discussion of the operation of the components within the system. FIG. 1 is a block diagram of a computing device 102 in which the disclosed herein may be implemented. The computing device 102 may be embodied as a computing device such as, but not limited to, a smartphone, a tablet computing device, a laptop, and so on.

A virtual makeup application 104 executes on a processor of the computing device 102 and includes a content analyzer 106, a makeup effects component 108, a target region analyzer 110, and a virtual effects applicator 112. The content analyzer 106 is configured to obtain a digital image depicting an individual and determine lighting conditions of the content in the digital image.

As one of ordinary skill will appreciate, the digital image may be encoded in any of a number of formats including, but not limited to, JPEG (Joint Photographic Experts Group) files, TIFF (Tagged Image File Format) files, PNG (Portable Network Graphics) files, GIF (Graphics Interchange Format) files, BMP (bitmap) files or any number of other digital formats. Alternatively, the digital image may be derived from a still image of a video encoded in formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), 360 degree video, 3D scan model, or any number of other digital formats.

For some embodiments, the content analyzer 106 determines the lighting conditions by estimating such parameters as the angle of lighting incident on the individual depicted in the digital image, a lighting intensity, a color of the lighting incident on the individual depicted in the digital image, and so on. One or more of these parameters are later utilized for adjusting a visual characteristic (e.g., color, intensity) of a makeup effect prior to being applied to the facial region of the individual. For some embodiments, the light conditions may be estimated by comparing a shadow effect on the individual depicted in the digital image with predefined three-dimensional (3D) models 118 having varying shadow effects, where the 3D models 118 are stored in a data store 116.

Each of the 3D models 118 has corresponding information relating to lighting conditions (e.g., the angle of lighting incident on the individual, a lighting intensity, a color of the lighting). The content analyzer 106 then identifies a closest matching 3D model 118 with lighting conditions of the matching 3D model 118 and utilizes that information as the estimated lighting conditions. Additional details on how the content analyzer 106 identifies a closest matching 3D model 118 are described below in connection with FIG. 12.

The makeup effects component 108 is configured to obtain selection of a makeup effect from a user and determine surface properties of the selected makeup effect. For some embodiments, the surface properties 120 of the variety of makeup effects that the user can select from are predefined and stored in the data store 116. The surface properties 120 may comprise a diffuse reflective property of the selected makeup effect, a specular reflective property of the selected makeup effect, and/or a degree of transparency of the selected makeup effect. When the user selects a desired makeup effect, the makeup effects component 108 retrieves the corresponding surface properties 120 from the data store 116.

The target region analyzer 110 is configured to apply a facial alignment technique to the facial region of the individual in the digital image and define a region of interest corresponding to the makeup effect. For example, if the selected makeup effect comprises a lipstick effect, the region of interest will be localized to the lips of the individual. The target region analyzer 110 is further configured to extract lighting conditions of the region of interest. The makeup effects component 108 then adjusts the visual characteristics of the makeup effect based on the surface properties of the makeup effect and the lighting conditions of the region of interest, where the adjustment is performed on a pixel-by-pixel basis since the lighting conditions may vary within the region of interest. The virtual effects applicator 112 is configured to perform virtual application of the adjusted makeup effect to the region of interest in the digital image.

Figure 2:
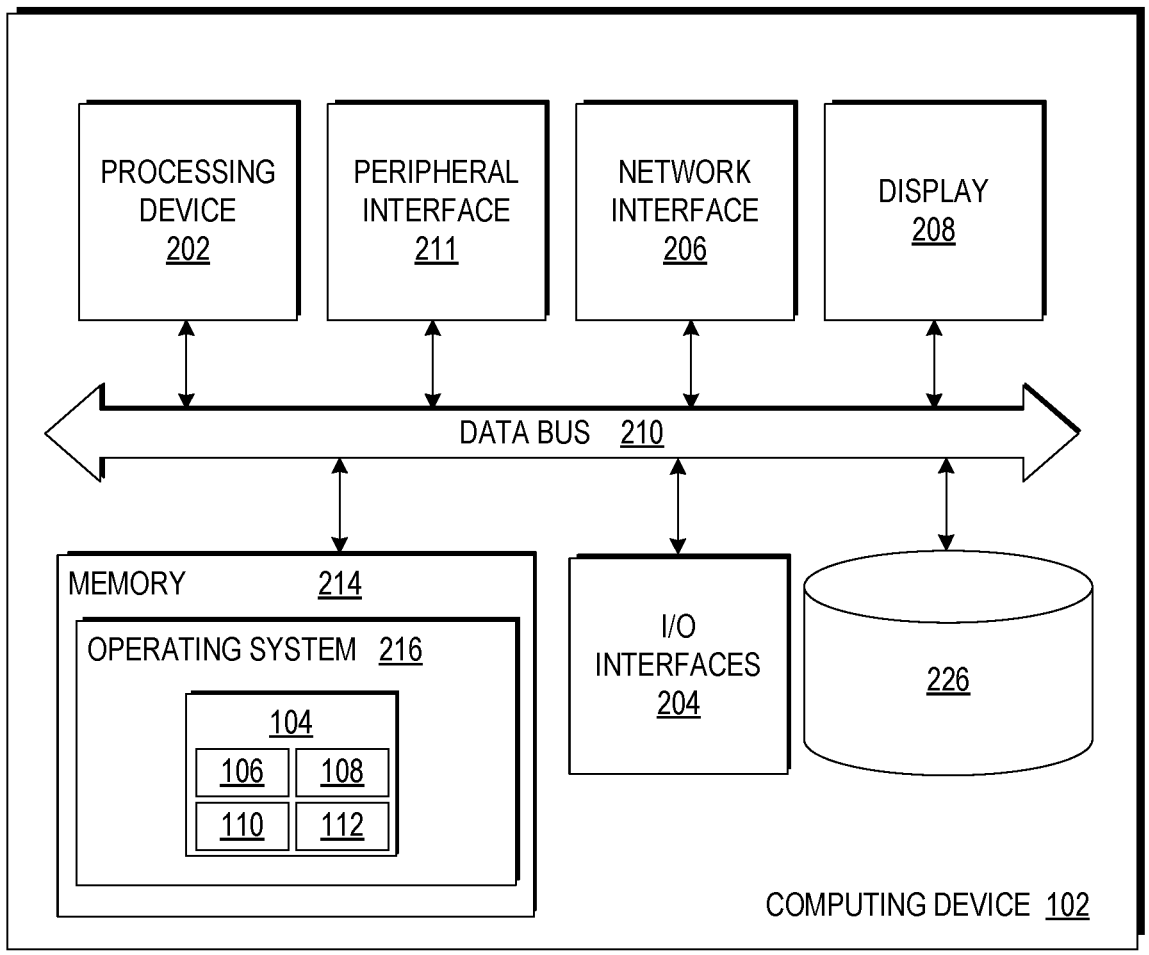
FIG. 2 is a schematic diagram of the computing device of FIG. 1 in accordance with various embodiments of the present disclosure.

FIG. 2 illustrates a schematic block diagram of the computing device 102 in FIG. 1. The computing device 102 may be embodied in any one of a wide variety of wired and/or wireless computing devices, such as a desktop computer, portable computer, dedicated server computer, multi-processor computing device, smart phone, tablet, and so forth. As shown in FIG. 2, the computing device 102 comprises memory 214, a processing device 202, a number of input/output interfaces 204, a network interface 206, a display 208, a peripheral interface 211, and mass storage 226, wherein each of these components are connected across a local data bus 210.

The processing device 202 may include any custom made or commercially available processor, a central processing unit (CPU) or an auxiliary processor among several processors associated with the computing device 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 may include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise some or all the components of the computing device 102 depicted in FIG. 1. In accordance with such embodiments, the components are stored in memory 214 and executed by the processing device 202, thereby causing the processing device 202 to perform the operations/functions disclosed herein. One of ordinary skill in the art will appreciate that the memory 214 can, and typically will, comprise other components which have been omitted for purposes of brevity. For some embodiments, the components in the computing device 102 may be implemented by hardware and/or software.

Input/output interfaces 204 provide any number of interfaces for the input and output of data. For example, where the computing device 102 comprises a personal computer, these components may interface with one or more user input/output interfaces 204, which may comprise a keyboard or a mouse, as shown in FIG. 2. The display 208 may comprise a computer monitor, a plasma screen for a PC, a liquid crystal display (LCD) on a hand held device, a touchscreen, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

Figure 3:
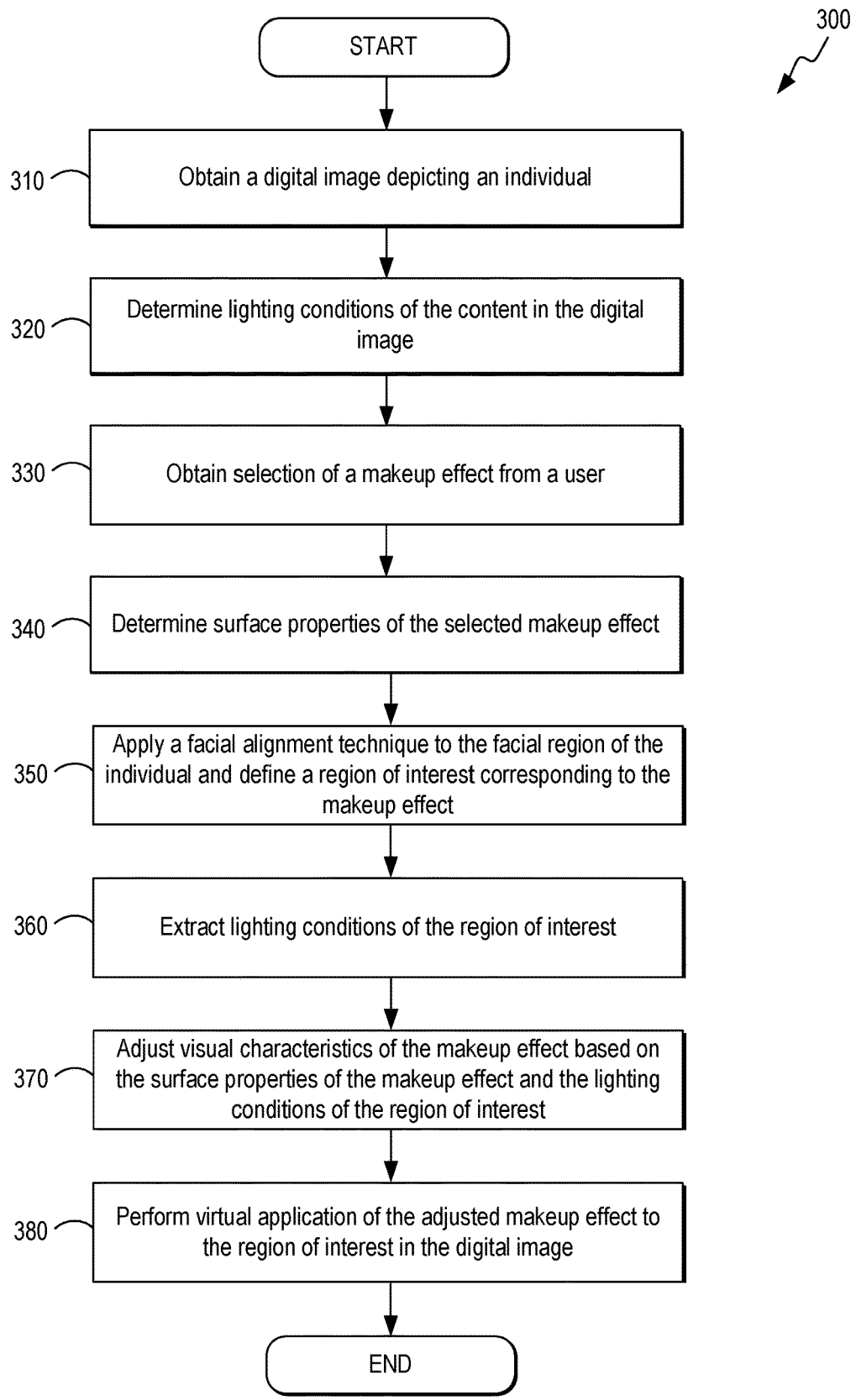
FIG. 3 is a top-level flowchart illustrating examples of functionality implemented as portions of the computing device of FIG. 1 for performing virtual application of makeup effects based on lighting conditions and surface properties of makeup effects according to various embodiments of the present disclosure.

Reference is made to FIG. 3, which is a flowchart 300 in accordance with various embodiments for virtual application of makeup effects based on lighting conditions and surface properties of makeup effects performed by the computing device 102 of FIG. 1. It is understood that the flowchart 300 of FIG. 3 provides merely an example of the different types of functional arrangements that may be employed to implement the operation of the various components of the computing device 102. As an alternative, the flowchart 300 of FIG. 3 may be viewed as depicting an example of steps of a method implemented in the computing device 102 according to one or more embodiments.

Although the flowchart 300 of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. It is understood that all such variations are within the scope of the present disclosure.

At block 310, the computing device 102 obtains a digital image depicting an individual. At block 320, the computing device 102 determines lighting conditions of the content in the digital image. For some embodiments, the computing device 102 determines the lighting conditions by estimating an angle of lighting incident on the individual depicted in the digital image, a lighting intensity, and/or a color of the lighting incident on the individual depicted in the digital image. For some embodiments, this information is estimated by comparing a shadow effect on the individual depicted in the digital image with predefined three-dimensional (3D) models having varying shadow effects, where each of the 3D models has corresponding information relating to lighting conditions.

The computing device 102 then identifies a closest matching 3D model based on comparing the shadow effect on the individual depicted in the digital image with the predefined three-dimensional (3D) models having varying shadow effects. The computing device 102 retrieves the corresponding information relating to the lighting conditions of the identified closest matching 3D model. For such embodiments, the corresponding information may comprise the angle of lighting incident on the individual depicted in the digital image, the lighting intensity, and/or the color of the lighting incident on the individual depicted in the digital image.

At block 330, the computing device 102 obtains selection of a makeup effect from a user. At block 340, the computing device 102 determines surface properties of the selected makeup effect. For some embodiments, the surface properties of the selected makeup effect may comprise a diffuse reflective property of the selected makeup effect, a specular reflective property of the selected makeup effect, and/or a degree of transparency of the selected makeup effect. For some embodiments, the surface properties of the selected makeup effect are predefined and stored in a data store 116 (FIG. 1). At block 350, the computing device 102 applies a facial alignment technique to the facial region of the individual and defines a region of interest corresponding to the makeup effect. At block 360, the computing device 102 extracts lighting conditions of the region of interest.

At block 370, the computing device 102 adjusts visual characteristics of the makeup effect based on the surface properties of the makeup effect and the lighting conditions of the region of interest. For some embodiments, the computing device 102 adjusts the visual characteristics by adjusting the color of the makeup effect based on the angle of lighting incident on the individual depicted in the digital image, the lighting intensity, and/or the color of the lighting incident on the individual depicted in the digital image. For some embodiments, the computing device 102 adjusts the color of the makeup effect on a pixel-by-pixel basis in the region of interest. At block 380, the computing device 102 performs virtual application of the adjusted makeup effect to the region of interest in the digital image. Thereafter, the process in FIG. 3 ends.

Figure 4:
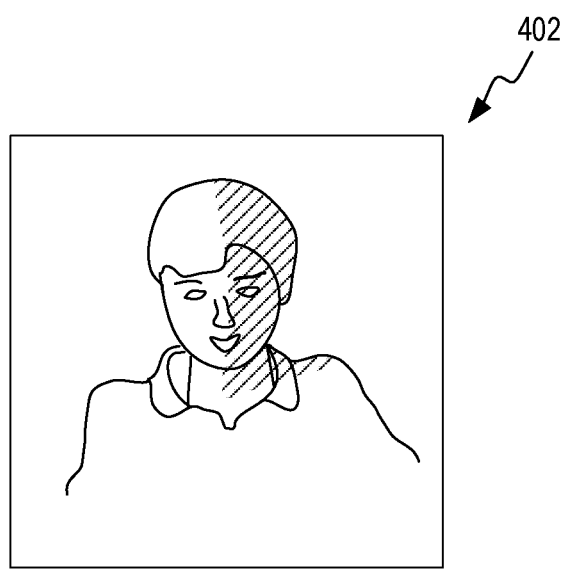
FIG. 4 illustrates a digital image obtained by the computing device in FIG. 1, where the digital image depicts an individual with a shadow effect on a portion of the individual's facial region.

To further illustrate various aspects of the present invention, reference is made to the following figures. FIG. 4 illustrates a digital image 402 obtained by the computing device 102 (FIG. 1), where the digital image 402 depicts an individual with a shadow effect on a portion of the individual's facial region. As described in more detail below, a selected makeup effect to be applied to the individual's facial region is modified according to the surface properties of the selected makeup effect and according to the lighting conditions depicted in the digital image 402.

Figure 5:
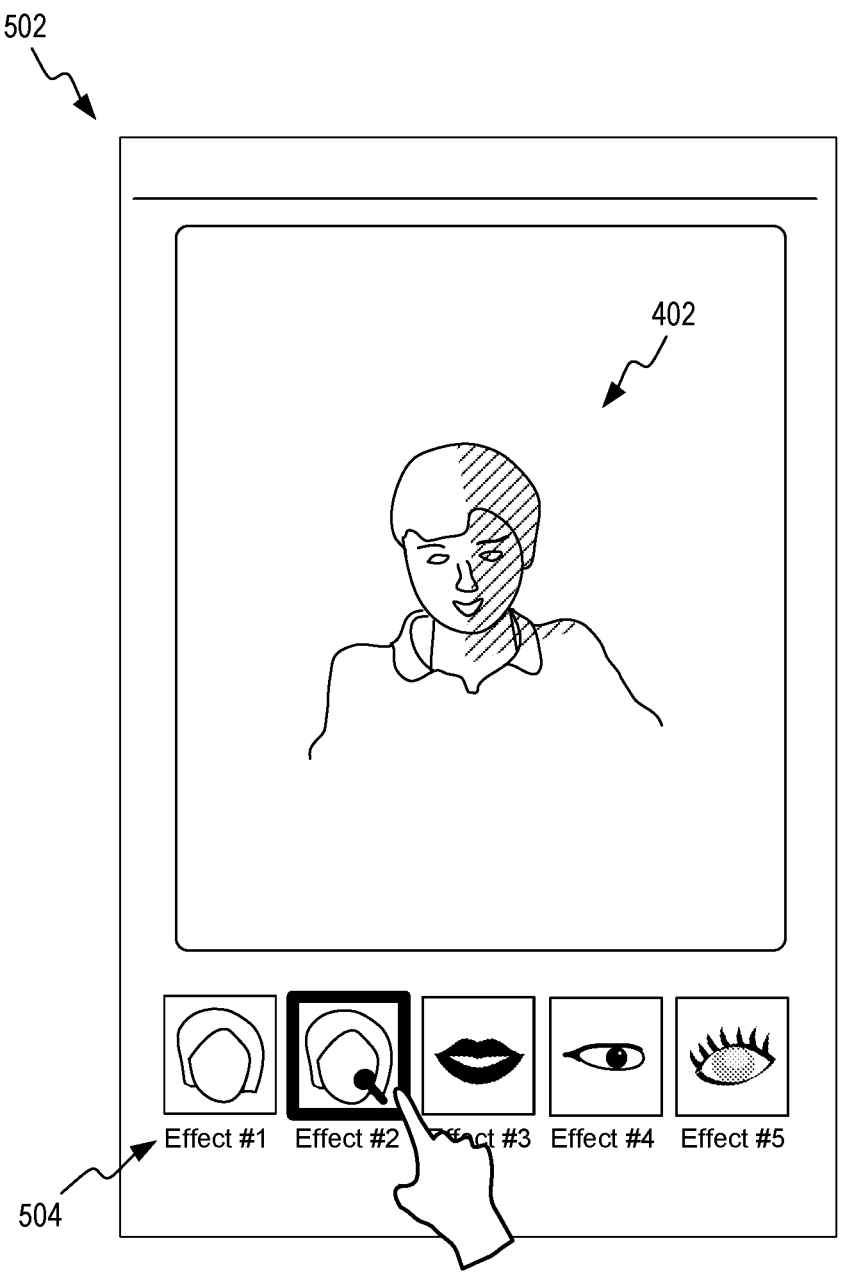
FIG. 5 illustrates an example user interface displayed on the computing device in FIG. 1, where the user interface includes an effects toolbar for selecting a desired makeup effect according to various embodiments of the present disclosure.

FIG. 5 illustrates an example user interface 502 displayed on the computing device 102 (FIG. 1), where the user interface 502 includes a makeup effects toolbar 504 for selecting a desired makeup effect. In the example shown, the user selects a blush effect to be applied to the digital image 402.

Figure 6:
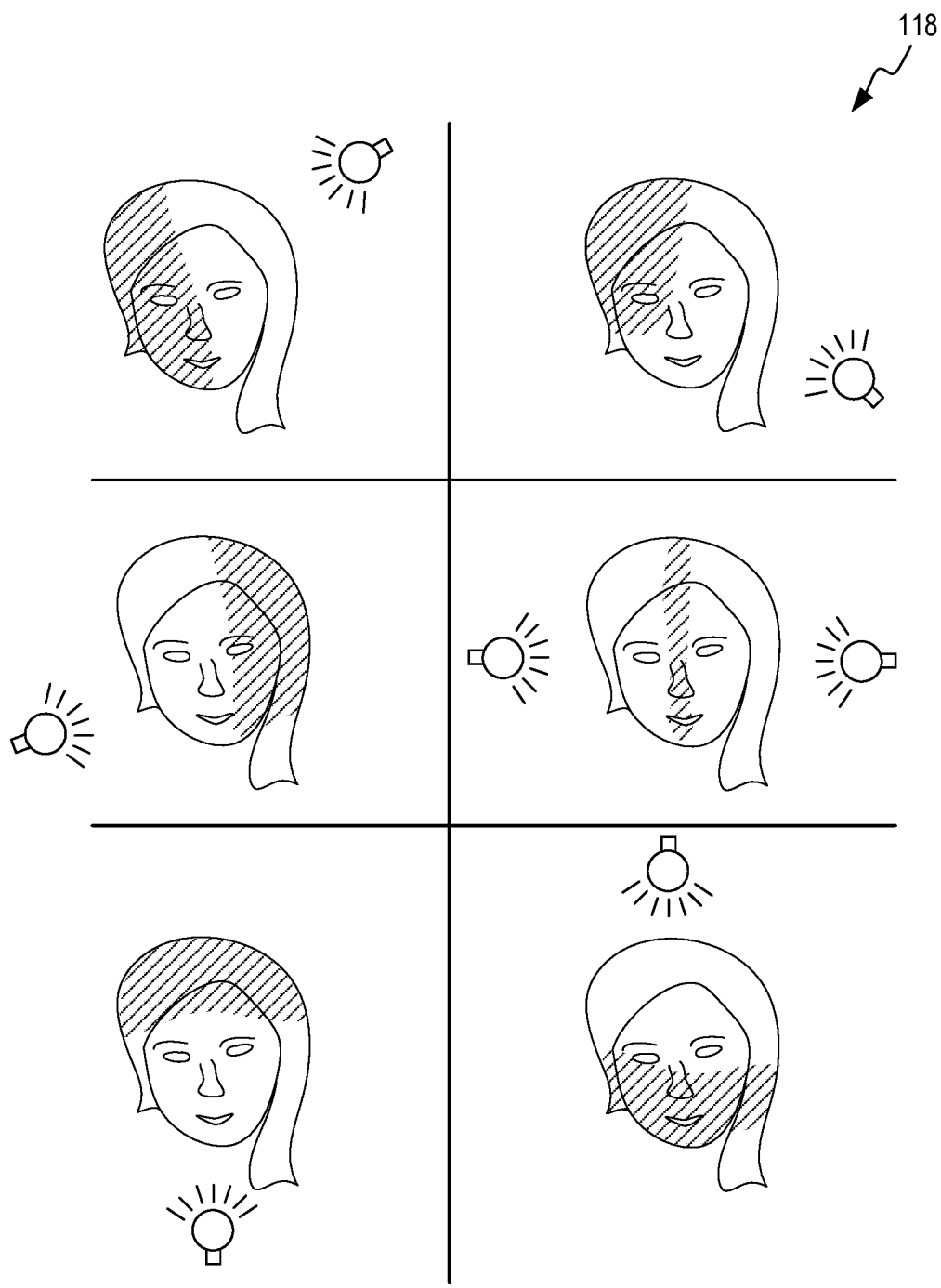
FIG. 6 illustrates predefined three-dimensional (3D) models having varying shadow effects utilized by the computing device in FIG. 1 according to various embodiments of the present disclosure.
Figure 7:
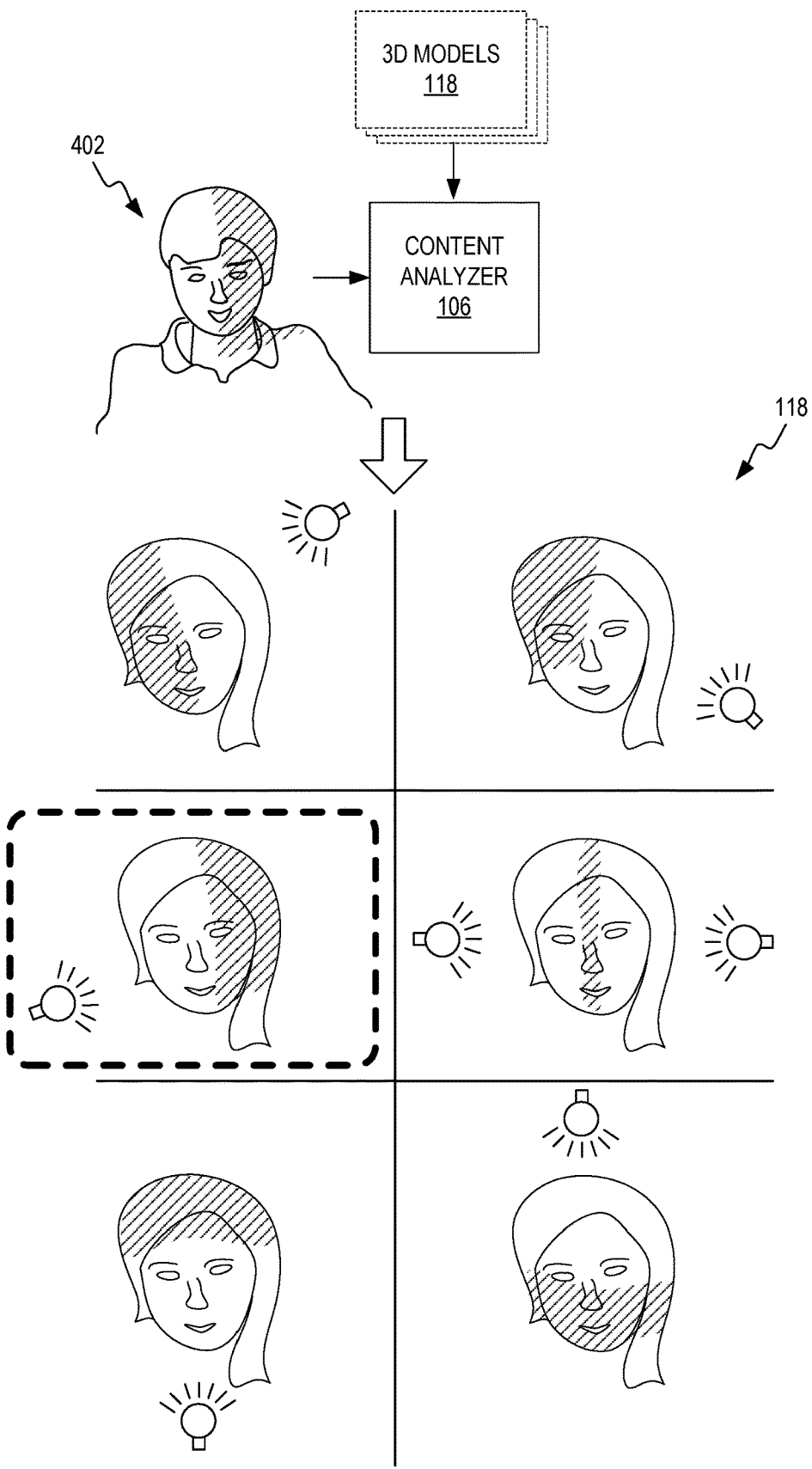
FIG. 7 illustrates the computing device in FIG. 1 identifying a closest matching 3D model for the digital image in FIG. 4 according to various embodiments of the present disclosure.

As described earlier, the content analyzer 106 (FIG. 1) determines the lighting conditions in the digital image 402 by estimating an angle of lighting incident on the individual depicted in the digital image, a lighting intensity, and/or a color of the lighting incident on the individual depicted in the digital image. For some embodiments, this information is estimated by comparing a shadow effect on the individual depicted in the digital image with predefined three-dimensional (3D) models 118 having varying shadow effects, where example 3D models 118 are shown in FIG. 6. Note that for purposes of illustration, only six different lighting conditions are shown. However, additional predefined 3D models 118 with varying lighting conditions can be stored. Each of the 3D models 118 has corresponding information relating to lighting conditions that result in the varying shadow effects. As shown in FIG. 7, the content analyzer 106 (FIG. 1) identifies a closest matching 3D model 118 based on comparing the shadow effect on the individual depicted in the digital image with the predefined three-dimensional (3D) models having varying shadow effects. The content analyzer 106 then retrieves the corresponding information relating to the lighting conditions of the identified closest matching 3D model 118.

Figure 8:
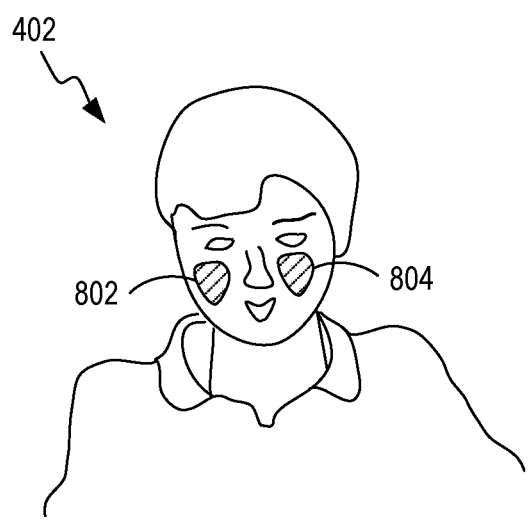
FIG. 8 illustrates the computing device in FIG. 1 applying a facial alignment technique to the facial region of the individual in the digital image in FIG. 4 and defining regions of interest corresponding to the makeup effect according to various embodiments of the present disclosure.

With reference to FIG. 8, the target region analyzer 110 (FIG. 1) applies a facial alignment technique to the facial region of the individual in the digital image 402 and defines regions of interest 802, 804 corresponding to the selected makeup effect. In the example shown, the user selects a blush makeup effect. Based on selection of the blush makeup effect, the target region analyzer 110 identifies regions of interest 802, 804 on the cheek areas of the individual.

Figure 9:
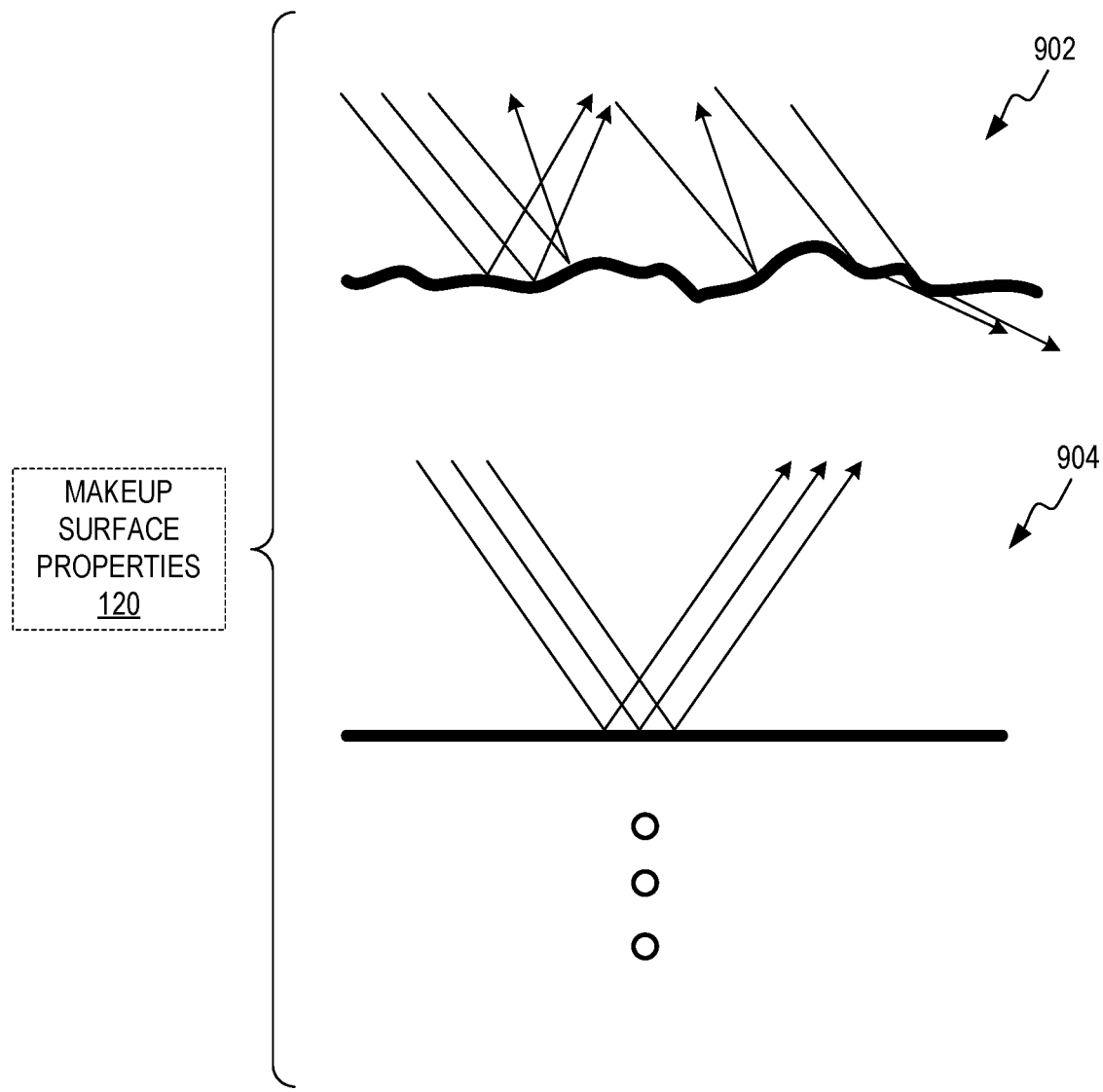
FIG. 9 illustrates examples of surface properties of the selected makeup effect according to various embodiments of the present disclosure.

As described above, the visual characteristics of the selected makeup effect are adjusted based on the lighting conditions of the region(s) of interest and based on the surface properties of the selected makeup effect prior to application of the selected makeup effect onto the region(s) of interest. As shown in FIG. 9, the surface properties of the selected makeup effect may include but are not limited to a diffuse reflective property 902 of the selected makeup effect, a specular reflective property 904 of the selected makeup effect, and/or other surface properties such as a degree of transparency of the selected makeup effect.

The diffuse reflective property 902 of the selected makeup effect generally describes the reflection of light from a surface such that a ray incident on the surface is scattered at many angles, whereas the specular reflective property 904 of the selected makeup effect generally describes the mirror-like reflection of light from a surface. The degree of transparency generally describes the degree in which light is allowed to pass through a material without being scattered. Other surface properties may include subsurface scattering, which generally describes how light that penetrates the surface of a translucent object is scattered by interacting with the material and exits the surface at a different point.

Figure 10:
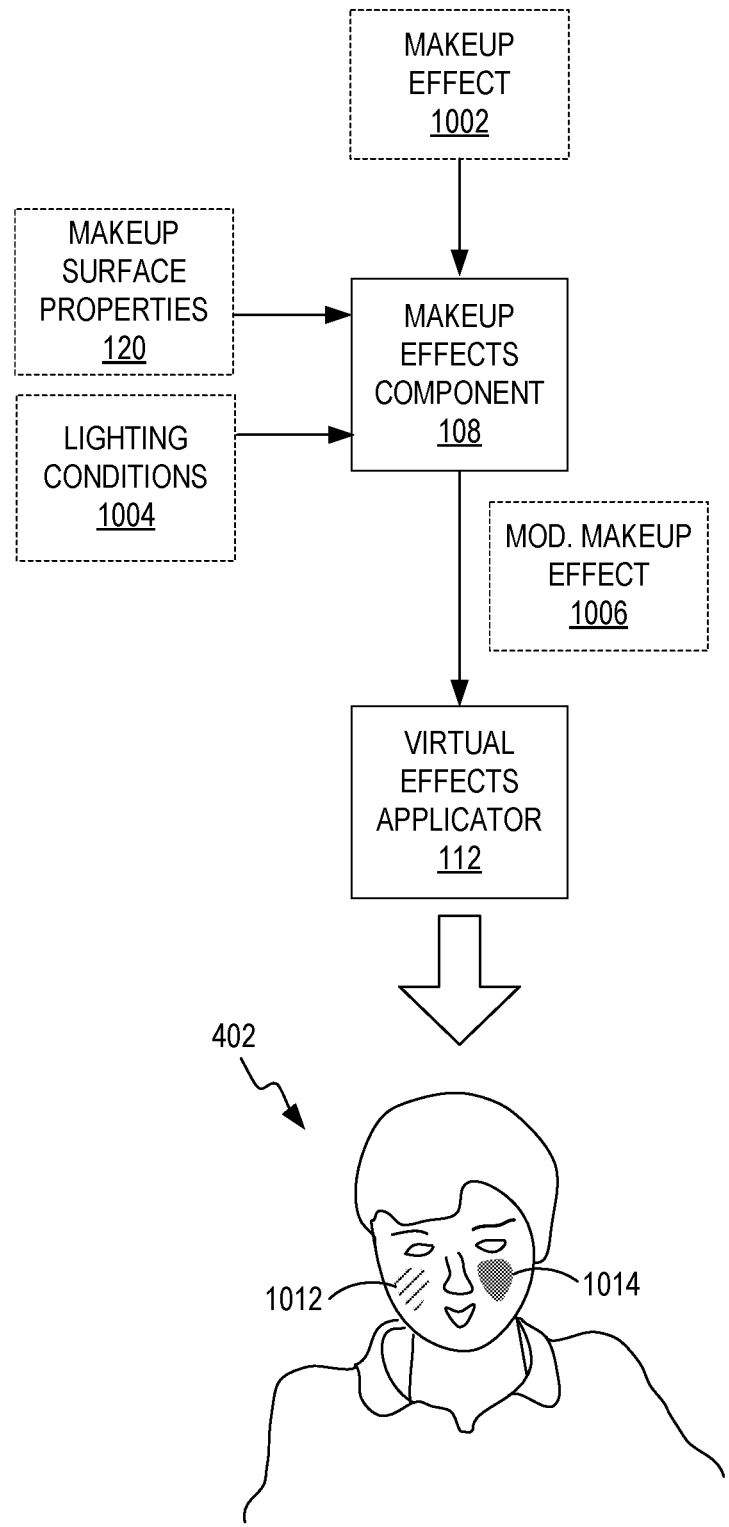
FIG. 10 illustrates the computing device in FIG. 1 adjusting the visual characteristics of the selected makeup effect based on the surface properties of the makeup effect and the lighting conditions of the region of interest to generate a modified makeup effect according to various embodiments of the present disclosure.

As shown in FIG. 10, the makeup effects component 108 adjusts the visual characteristics of the selected makeup effect based on both the surface properties 120 of the selected makeup effect and the lighting conditions 1004 of the region of interest to generate a modified makeup effect 1006. The virtual effects applicator 112 then performs virtual application of the modified makeup effect 1006 to the regions of interest 1012, 1014 in the digital image 402. Note that the makeup effects component 108 adjusts the visual characteristics of the selected makeup effect on a pixel-by-pixel basis as the lighting conditions may vary within a region of interest. In the example digital image 402 shown in FIG. 4, the shadow effect is prevalent on one side of the facial region. As a result, the visual characteristics of the selected makeup effect (e.g., blush effect) vary within the regions of interest 1012, 1014.

Figure 11:
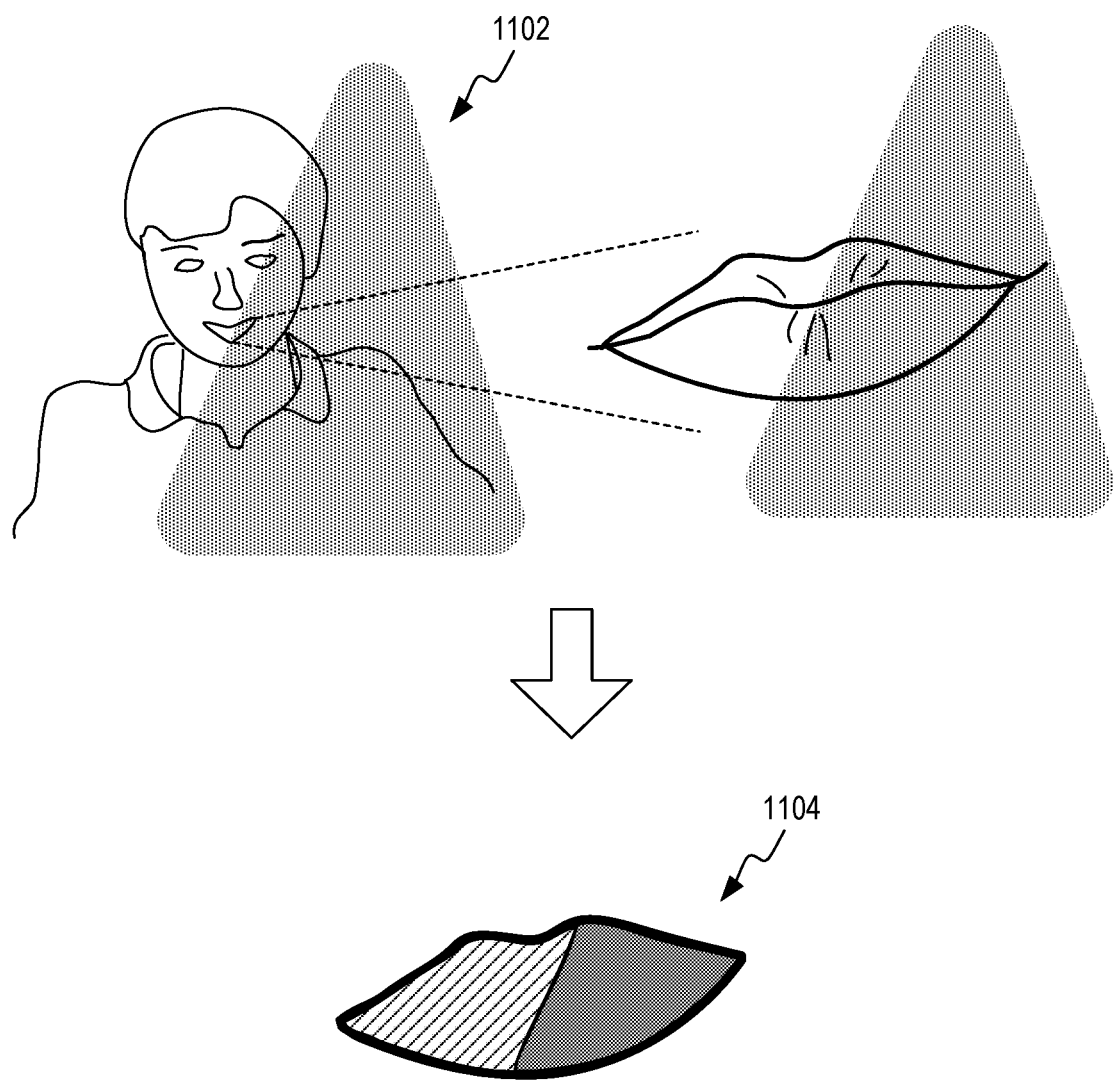
FIG. 11 illustrates modification of a makeup effect on a pixel-by-pixel basis within a region of interest according to various embodiments of the present disclosure.

To further illustrate, reference is made to FIG. 11, which illustrates modification of a makeup effect on a pixel-by-pixel basis within a region of interest 1104 according to various embodiments of the present disclosure. In the example shown, the selected makeup effect comprises a lipstick effect. Based on this selection, the target region analyzer 110 (FIG. 1) determines that the region of interest 1104 comprises the lips of the individual. As shown, a portion of the individual's lips is under a shadow 1102. As a result, the visual characteristics of the lipstick effect will vary within the region of interest 1104 as the visual characteristics are adjusted on a pixel-by-pixel basis. Once the visual characteristics of the lipstick are adjusted, the adjusted lipstick effect is applied to the region of interest 1104.

Figure 12:
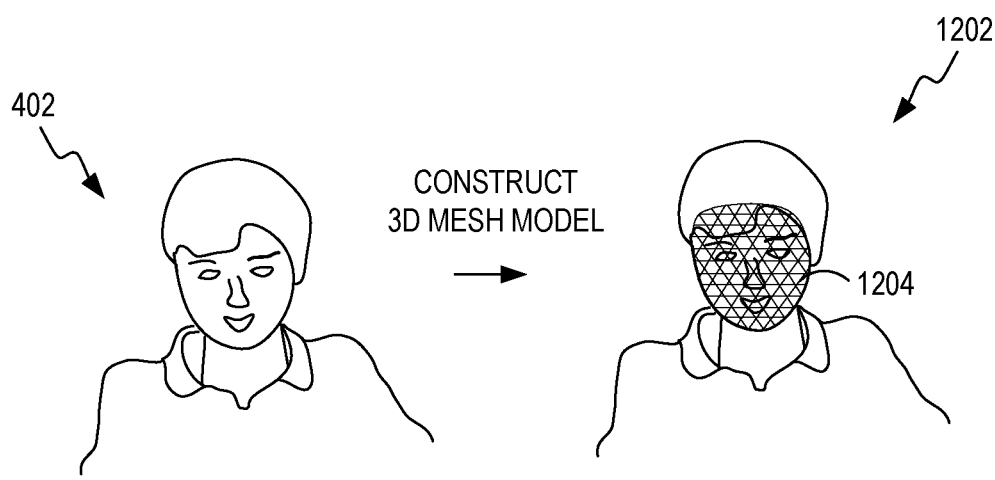
FIG. 12 illustrates how the computing device of FIG. 1 identifies a closest matching 3D model according to various embodiments of the present disclosure.
Figure 12:
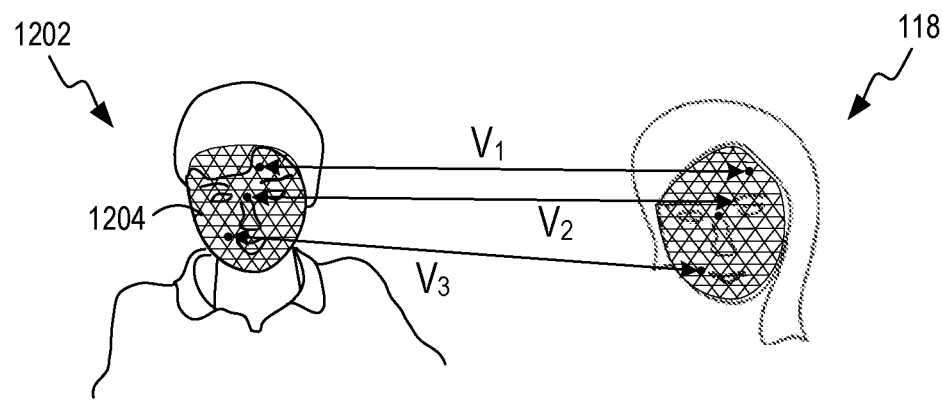

FIG. 12 illustrates how the computing device 102 of FIG. 1 identifies a closest matching 3D model according to various embodiments of the present disclosure. For some embodiments, the content analyzer 106 (FIG. 1) executing in the computing device 102 analyzes the digital image 402 of the individual and identifies a closest matching 3D model 118 based on the various lighting conditions or shadow effects of the 3D models 118. Predefined 3D models 118 with varying lighting conditions are shown, for example, in FIG. 6.

As shown in FIG. 12, the content analyzer 106 first converts the digital image 402 of the individual to a luminance-only image 1202. The content analyzer 106 then constructs a 3D mesh model 1204 from the luminance-only image 1202. For each of the predefined 3D models 118, the content analyzer 106 processes the 3D mesh model 1204 associated with the individual and derives a plurality of vertices (1 to n) with respect to corresponding points on a 3D mesh model of the current 3D model 118. Specifically, the content analyzer 106 determines the degree of correlation in luminance values for each of a plurality of image points $I_1$ to $I_n$ corresponding to vertices (1 to n) for Image A and Image B, where Image A corresponds to the 3D mesh model 1204 associated with the individual and Image B corresponds to the 3D mesh model of the current 3D model 118 being processed. The 3D model 118 that exhibits a highest degree of correlation between corresponding image points $I_1$ to $I_n$ with respect to the 3D mesh model 1204 associated with the individual is determined to be the closest matching 3D model 118.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A method implemented in a computing device, comprising:

obtaining a digital image depicting an individual;

determining lighting conditions of the content in the digital image, wherein determining the light conditions comprises estimating at least one of: an angle of lighting incident on the individual depicted in the digital image; a lighting intensity; and a color of the lighting incident on the individual depicted in the digital image by:

comparing a shadow effect on the individual depicted in the digital image with predefined three-dimensional (3D) models having varying shadow effects, each of the 3D models having corresponding information relating to lighting conditions;

identifying a closest matching 3D model based on comparing the shadow effect on the individual depicted in the digital image with the predefined 3D models having varying shadow effects; and retrieving the corresponding information relating to the lighting conditions of the identified closest matching 3D model, the corresponding information comprising at least one of: the angle of lighting incident on the individual depicted in the digital image, the lighting intensity, and the color of the lighting incident on the individual depicted in the digital image;

wherein identifying the closest matching 3D model based on comparing the shadow effect on the individual depicted in the digital image with the predefined 3D models having varying shadow effects comprises:

converting the digital image depicting the individual to a luminance-only image;

constructing a 3D mesh model from the luminance-only image;

for each of the 3D models having varying shadow effects, determining a degree of correlation in luminance values between each 3D model and the constructed 3D mesh model; and identifying the closest matching 3D model based on a 3D model having a highest degree of correlation with the 3D mesh model;

obtaining selection of a makeup effect from a user;

determining surface properties of the selected makeup effect;

applying a facial alignment technique to a facial region of the individual and defining a region of interest corresponding to the makeup effect;

extracting lighting conditions of the region of interest;

adjusting visual characteristics of the makeup effect based on the surface properties of the makeup effect and the lighting conditions of the region of interest; and performing virtual application of the adjusted makeup effect to the region of interest in the digital image.

2. The method of claim 1, wherein adjusting the color of the makeup effect is performed on a pixel-by-pixel basis in the region of interest.

3. The method of claim 1, wherein the surface properties of the selected makeup effect comprise at least one of: a diffuse reflective property of the selected makeup effect; a specular reflective property of the selected makeup effect; and a degree of transparency of the selected makeup effect.

4. The method of claim 1, wherein the surface properties of the selected makeup effect are predefined and stored in a data store.

5. The method of claim 1, further comprising deriving a plurality of image points from the 3D mesh model, wherein determining the degree of correlation in luminance values between each 3D model and the constructed 3D mesh model comprises comparing luminance values for each of the plurality of image points in the 3D mesh model and luminance values for corresponding image points in each of the 3D models.

6. A system, comprising:

a memory storing instructions; a processor coupled to the memory and configured by the instructions to at least:

obtain a digital image depicting an individual;

determine lighting conditions of the content in the digital image, wherein determining the light conditions comprises estimating at least one of: an angle of lighting incident on the individual depicted in the digital image; a lighting intensity; and a color of the lighting incident on the individual depicted in the digital image by:

compare a shadow effect on the individual depicted in the digital image with predefined three-dimensional (3D) models having varying shadow effects, each of the 3D models having corresponding information relating to lighting conditions;

identify a closest matching 3D model based on comparing the shadow effect on the individual depicted in the digital image with the predefined 3D models having varying shadow effects; and retrieve the corresponding information relating to the lighting conditions of the identified closest matching 3D model, the corresponding information comprising at least one of: the angle of lighting incident on the individual depicted in the digital image, the lighting intensity, and the color of the lighting incident on the individual depicted in the digital image;

wherein identifying the closest matching 3D model based on comparing the shadow effect on the individual depicted in the digital image with the predefined 3D models having varying shadow effects comprises:

convert the digital image depicting the individual to a luminance-only image;

construct a 3D mesh model from the luminance-only image;

for each of the 3D models having varying shadow effects, determine a degree of correlation in luminance values between each 3D model and the constructed 3D mesh model; and identify the closest matching 3D model based on a 3D model having a highest degree of correlation with the 3D mesh model;

obtain selection of a makeup effect from a user;

determine surface properties of the selected makeup effect;

apply a facial alignment technique to a facial region of the individual and define a region of interest corresponding to the makeup effect; extract lighting conditions of the region of interest;

adjust visual characteristics of the makeup effect based on the surface properties of the makeup effect and the lighting conditions of the region of interest; and perform virtual application of the adjusted makeup effect to the region of interest in the digital image.

7. The system of claim 6, wherein the processor adjusts the color of the makeup effect on a pixel-by-pixel basis in the region of interest.

8. The system of claim 6, wherein the surface properties of the selected makeup effect comprise at least one of: a diffuse reflective property of the selected makeup effect; a specular reflective property of the selected makeup effect; and a degree of transparency of the selected makeup effect.

9. The system of claim 6, wherein the surface properties of the selected makeup effect are predefined and stored in a data store.

10. A non-transitory computer-readable storage medium storing instructions to be implemented by a computing device having a processor, wherein the instructions, when executed by the processor, cause the computing device to at least:

obtain a digital image depicting an individual;

determine lighting conditions of the content in the digital image, wherein determining the light conditions comprises estimating at least one of: an angle of lighting incident on the individual depicted in the digital image; a lighting intensity; and a color of the lighting incident on the individual depicted in the digital image by:

compare a shadow effect on the individual depicted in the digital image with predefined three-dimensional (3D) models having varying shadow effects, each of the 3D models having corresponding information relating to lighting conditions;

identify a closest matching 3D model based on comparing the shadow effect on the individual depicted in the digital image with the predefined 3D models having varying shadow effects; and retrieve the corresponding information relating to the lighting conditions of the identified closest matching 3D model, the corresponding information comprising at least one of: the angle of lighting incident on the individual depicted in the digital image, the lighting intensity, and the color of the lighting incident on the individual depicted in the digital image;

wherein identifying the closest matching 3D model based on comparing the shadow effect on the individual depicted in the digital image with the predefined 3D models having varying shadow effects comprises:

convert the digital image depicting the individual to a luminance-only image;

construct a 3D mesh model from the luminance-only image;

for each of the 3D models having varying shadow effects, determine a degree of correlation in luminance values between each 3D model and the constructed 3D mesh model; and identify the closest matching 3D model based on a 3D model having a highest degree of correlation with the 3D mesh model;

obtain selection of a makeup effect from a user;

determine surface properties of the selected makeup effect;

apply a facial alignment technique to a facial region of the individual and define a region of interest corresponding to the makeup effect;

extract lighting conditions of the region of interest;

adjust visual characteristics of the makeup effect based on the surface properties of the makeup effect and the lighting conditions of the region of interest; and perform virtual application of the adjusted makeup effect to the region of interest in the digital image.

11. The non-transitory computer-readable storage medium of claim 10, wherein the processor adjusts the color of the makeup effect on a pixel-by-pixel basis in the region of interest.

12. The non-transitory computer-readable storage medium of claim 10, wherein the surface properties of the selected makeup effect comprise at least one of: a diffuse reflective property of the selected makeup effect; a specular reflective property of the selected makeup effect; and a degree of transparency of the selected makeup effect.

* * * * *